April 18, 1961 P. JACOBS 2,980,189
ROCK DIGGER AND PICKER
Filed March 19, 1959
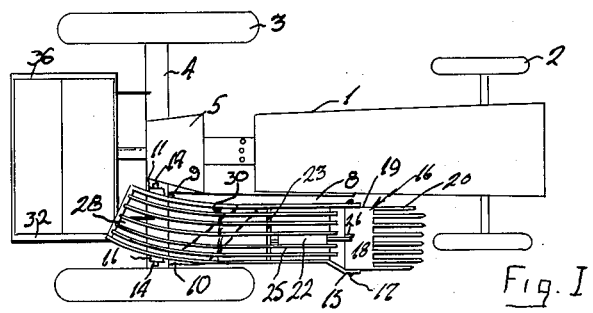
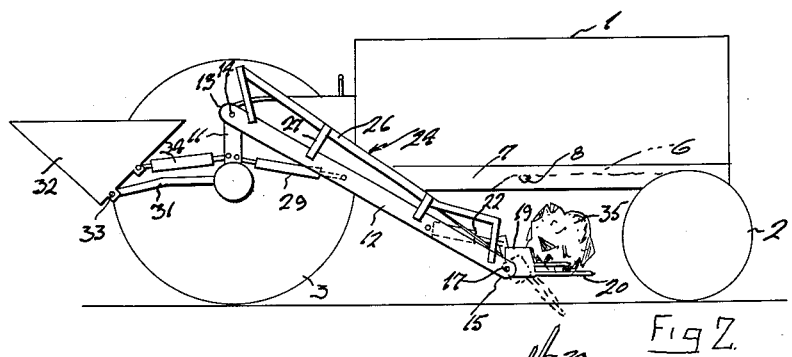
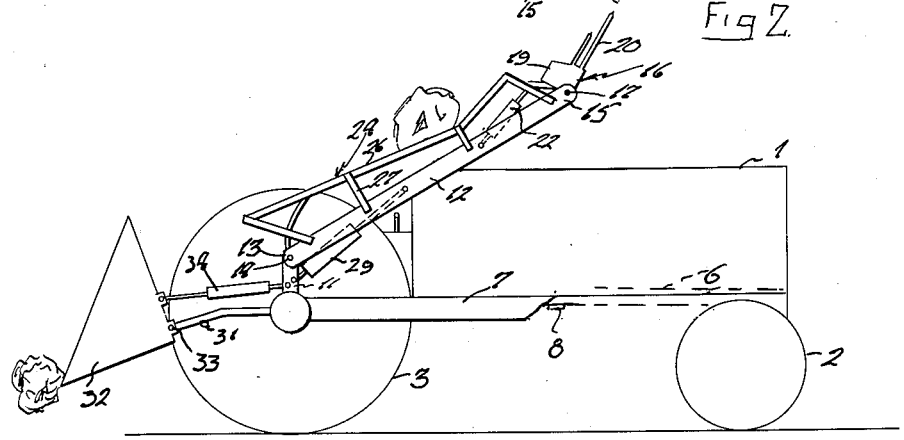
INVENTOR:
PAUL JACOBS.
ATT'YS.

Patented Apr. 18, 1961

2,980,189
ROCK DIGGER AND PICKER
Paul Jacobs, Box 68, Sylvania, Saskatchewan, Canada
Filed Mar. 19, 1959, Ser. No. 800,550
1 Claim. (Cl. 171—63)

My invention relates to new and useful improvements in rock digging and picking devices, particularly those adapted to be utilized with a conventional tractor.

While rock gathering means are in existence to collect loose stones and rocks from the surface of the ground, nevertheless the most difficult operation is the removal of partially embedded rocks from the ground. Devices are in existence which are mounted upon the front of a tractor for this purpose, but it will be appreciated that it is almost impossible for the operator to have a clear view of the apparatus at the moment that it engages the ground and it is important that the digging points be placed correctly with relation to the embedded rock, otherwise the raising of the rock is rendered more difficult.

By providing a device mounted upon one side of the tractor and designed to operate between the front and rear wheels thereof, the operator has a full view of operation and can disengage the rock from the ground with the minimum of maneuvering.

I accomplish this by providing a pair of side members pivotally supported upon the frame and having a rock digging assembly on the lower end thereof, all of which is controlled by hydraulic cylinders. Once the rock has been removed from the ground, the side members can be elevated so that the rock is conveyed rearwardly to a dumpable bin spanning the rear of the tractor.

The principal object and essence of my invention is therefore to provide a rock digging and picking device which can be utilized on rocks upon the surface of the ground or rocks embedded therein, the operator having a full view of the operation at all times.

A further object of my invention is to provide a device of the character herewithin described which does not interfere with the normal use of the tractor.

Still another object of my invention is to provide a device of the character herewithin described in which the digging and picking assembly is independently hydraulically controlled from the elevating assembly.

A still further object of my invention is to provide a device of the character herewithin described in which the conveyor curves at the rear end thereof towards the center of the bin thus assisting in the distribution of rocks within the bin which, of course, is centrally located upon the rear of the tractor.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a top plan view of a tractor with my device in situ.

Figure 2 is a side elevation of my device but enlarged with respect to Figure 1 and showing the bin in the rock receiving position and the digger with a rock about to be conveyed to the bin.

Figure 3 is a view similar to Figure 2 but showing the bin in the dumping position and showing the conveyor in the elevated position.

In the drawings like characters of reference indicate corresponding parts in the different figures.

Proceeding, therefore to describe my invention in detail, it will be seen upon reference to the accompanying drawing that I have illustrated, in single line, a conventional tractor 1 having front wheels 2 and relatively large rear wheels 3 supported upon axle 4 with the operator's seat position indicated at 5.

The main frame of the tractor is indicated generally at 6 and a main supporting beam 7 is secured to part of the frame 6 by means of bolts 8. This main beam extends rearwardly and diverges to form the arms 9 and 10 which in turn support a pair of spaced and parallel vertical beams 11 substantially above the rear axle, the casing of which is used to support the structure.

A pair of side frame members 12 are pivotally secured by the rear end 13 thereof to the upper ends of beams 11 by means of pivot pins 14 and these side frame members extend forwardly of the rear axle and terminate at forward ends 15 between the front wheels 2 and the rear wheels 3 of the tractor.

A digging and lifting assembly collectively designated 16 spans the forward ends 15 of the side frame members and is secured therebetween by means of pivot pin 17. This digging and lifting assembly comprises a plate 18, sides 19 extending upwardly therefrom, and a plurality of spaced and parallel digging teeth 20 extending forwardly thereof. A lug 21 extends upwardly from the plate 18 and pivotally secured to this lug is an hydraulic piston and cylinder assembly 22, the rear end of which is anchored to a cross member 23 spanning the aforementioned side frame members 12. From the foregoing it will be appreciated that the hydraulic piston and cylinder assembly controls the relationship of digging and lifting assembly with respect to the side frame members, so that the digging and lifting assembly 16 can be pivotally moved between the position shown in phantom in Figure 2 and the position shown in Figure 3.

The side frame members carry a rock guiding and conveying assembly collectively designated 24, said assembly comprising a plurality of spaced and parallel rails 25 supported between the side frame members 12 and extending from adjacent the forward ends 15 thereof to the rear end 13 thereof. Guard rails 26, supported upon struts 27 extend upwardly from each side frame member and maintain the rocks upon the rail 25 during the conveying movement. Reference to Figure 1 will show that the rear ends 28 of the side frame members 12 and the conveyor rails 25, curve inwardly towards the center line of the tractor and extend beyond the rear axle casing 4 thereof.

Further hydraulic cylinder and piston means 29 extend between the members 11 and the conveyor assembly, being pivotally secured to both so that operation of the hydraulic cylinder and piston 29 raises or lowers the side frame members together with the digging and lifting components between the limits shown in Figures 2 and 3. In this connection a further cross member 30 spans the side frame member 12 for securement of the front end of the hydraulic cylinder and piston assembly 29.

Bearer arms 31 extend rearwardly from the chassis frame and carry a bin 32 pivotally mounted by pin 33 upon the rear end thereof. Hydraulic piston and cylinder means 34 extend between the tractor and the bin so that the bin can be maintained in the position shown in Figure 2, at which time it can receive and store rocks, or, alternatively, it can be placed in the position shown in Figure 3 by extending the hydraulic system and cylinder 34 so that rocks contained in the bin 32 can be dumped where desired.

In operation, the tractor is guided to a position adjacent the rock to be raised, and the side frame members are placed in the position shown in Figure 2. The digging and lifting assembly is then lowered to the position shown in phantom in Figure 2 and the tractor maneuvered so that the rock is disengaged from the ground and is engaged upon the tines 20. By operating the hydraulic piston and cylinder assembly 22 the rock 35 can be lifted to the position shown in Figure 2 whereupon the hydraulic system and cylinder assembly 29 is extended to raise the entire device to the position shown in Figure 3. The rock then rides by gravity down and along the rails 25, so that it is dumped within the bin or bucket 32. In this regard the curved rear end of the conveyor portion, urges the rock over towards the far side 36 of the bin so that distribution of the rocks within the bin is maintained.

When it is desired to dump the bin, the bin is placed in the position shown in Figure 3 thus automatically dumping the rocks due to the sloping faced configuration thereof.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

The combination of a tractor having a frame supported by front and rear wheels and also having an operator's seat disposed between the rear wheels, and a rock picking and gathering attachment comprising an elongated support member disposed at one side of said tractor frame between said seat and one of said rear wheels, said support member having a front end and a rear end, the rear end of the support member being pivotally connected to the tractor frame at a point adjacent said one of said rear wheels whereby the support member may be raised and lowered, means for raising and lowering said support member, a vertically tiltable rock picking unit pivotally mounted at the front end of said support member in a position wherein it is readily visible to an occupant of said seat, a rock conveying chute extending rearwardly on said support member from said picking unit to the rear end of the support member, means for tilting said picking unit whereby a rock picked thereby may be deposited on said chute and gravitate rearwardly thereon when said support member is raised, a rock receptacle tiltably mounted at the rear of the tractor frame between said rear wheels, said chute having a laterally inwardly curved rear end portion adapted to discharge rocks into said receptacle, and means for tilting the receptacle to dump rocks accumulated therein.

References Cited in the file of this patent

UNITED STATES PATENTS

| | | |
|---|---|---|
| 2,682,715 | Walby | July 6, 1954 |
| 2,738,633 | Bestland et al. | Mar. 20, 1956 |
| 2,852,082 | Petersen | Sept. 16, 1958 |